US007834260B2

(12) United States Patent
Hardesty et al.

(10) Patent No.: US 7,834,260 B2
(45) Date of Patent: Nov. 16, 2010

(54) COMPUTER ANALYSIS AND MANIPULATION OF MUSICAL STRUCTURE, METHODS OF PRODUCTION AND USES THEREOF

(76) Inventors: Jay William Hardesty, 1 University Pl., #10G, New York, NY (US) 10003; John Underkoffler, 936 Oneonta Dr., Los Angeles, CA (US) 90065; Drazen Bosnjak, 22 Howard St., #5C, New York, NY (US) 10013

( * ) Notice: Subject to any disclaimer, the term of this patent is extended or adjusted under 35 U.S.C. 154(b) by 697 days.

(21) Appl. No.: 11/638,791

(22) Filed: Dec. 14, 2006

(65) Prior Publication Data

US 2007/0193435 A1 Aug. 23, 2007

Related U.S. Application Data

(60) Provisional application No. 60/597,642, filed on Dec. 14, 2005.

(51) Int. Cl.
*G04B 13/00* (2006.01)
*G09B 15/00* (2006.01)
*G10H 1/00* (2006.01)
*G10H 7/00* (2006.01)

(52) U.S. Cl. ......................... 84/609; 84/477 R; 84/601; 84/603; 84/612; 84/613

(58) Field of Classification Search ................... 84/609, 84/477 R, 601, 603, 612, 613
See application file for complete search history.

(56) References Cited

U.S. PATENT DOCUMENTS 5,315,057 A * 5/1994 Land et al. .................... 84/601
5,552,560 A * 9/1996 Ura ............................. 84/653
5,773,741 A * 6/1998 Eller et al. .................... 84/609

(Continued)

OTHER PUBLICATIONS

Lerdahl, Fred, A Generative Theory of Tonal Music, 1983, pp. 346 to 352, MIT Press, Cambridge, MA.

(Continued)

*Primary Examiner*—Jeffrey Donels
*Assistant Examiner*—Christina Russell
(74) *Attorney, Agent, or Firm*—Sandra P. Thompson; Buchalter Nemer

(57) ABSTRACT

A music modification system is provided and described herein, which includes: a) a computer, b) a music element library, c) at least one part-score database, d) a software code that executes a music modification system on the computer, wherein the music modification system accesses or manipulates the information in the music element library and accesses the at least one part-score database, and e) a graphical or audio user interface that is coupled to the computer. Methods of modifying a musical score or piece are described herein and include: a) providing a music element library, b) providing at least one part-score database, wherein the database comprises at least one music score, at least one music pieces, at least one music part or a combination thereof, c) providing an executable music modification system, and d) utilizing the music modification system and the music element library to modify at least part of the at least one part-score database. A software code is also described that executes a music modification system on a computer, wherein the music modification system accesses or manipulates a set of information in a music element library and accesses at least one part-score database.

12 Claims, 3 Drawing Sheets

U.S. PATENT DOCUMENTS

| | | | | |
|---|---|---|---|---|
| 5,777,253 | A * | 7/1998 | Kurebayashi | 84/613 |
| 6,001,013 | A * | 12/1999 | Ota | 463/7 |
| 7,309,826 | B2 * | 12/2007 | Morley et al. | 84/483.1 |
| 2004/0025668 | A1 * | 2/2004 | Jarrett et al. | 84/477 R |
| 2005/0154608 | A1 * | 7/2005 | Paulson et al. | 705/1 |

OTHER PUBLICATIONS

Heinz-Otto, Peitgan, Chaos and Fractals: New Frontiers of Science, 1992, pp. 423 to 433, Springer, New York, NY.

Temperley, Davie, The Cognition of Basic Musical Structures, 2001, pp. 239 to 253, MIT Press, Cambrigde, MA.

Komar, Arthur, The Theory of Suspensions: A Study of Metrical and Pitch Relations in Tonal Music, 1971, pp. 49 to 63, Princeton University Press, Princeton.

Wolfram, Stephen, A New Kind of Science, 2002, p. 955, Wolfram Media, Champaign, IL.

* cited by examiner

FIG. 4
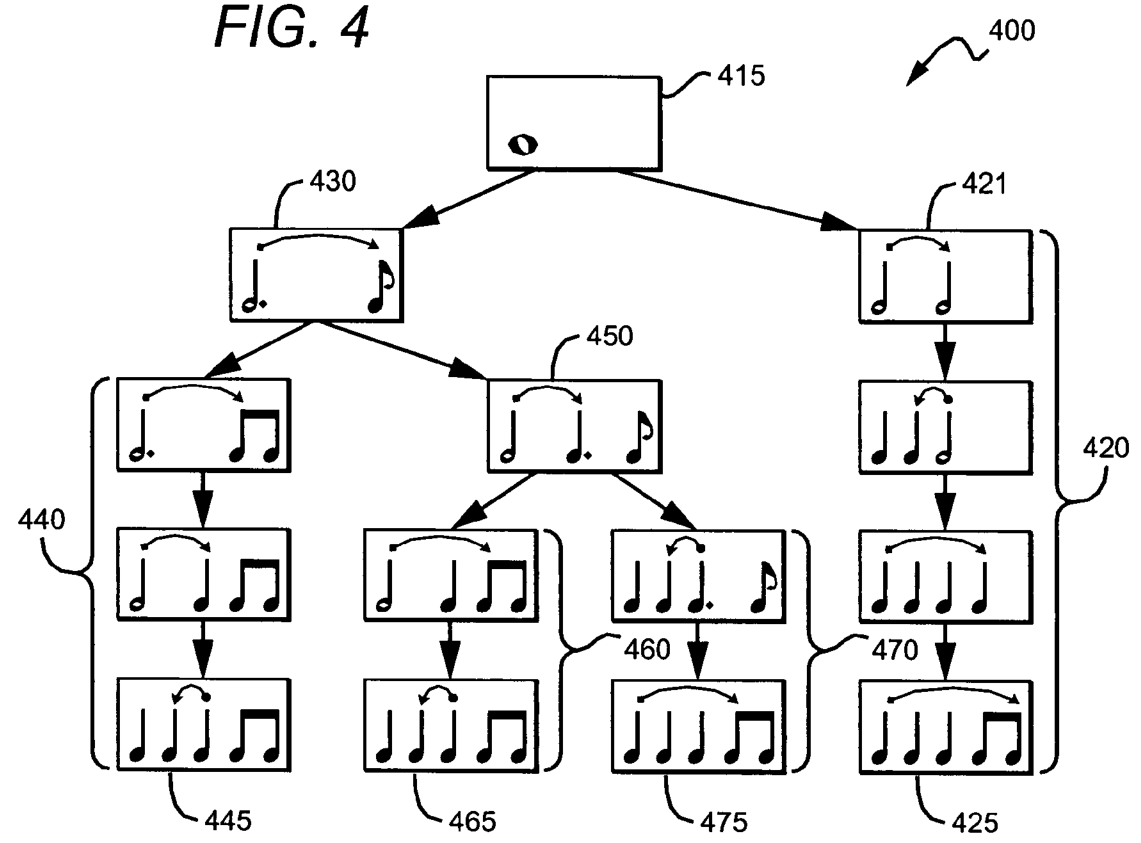
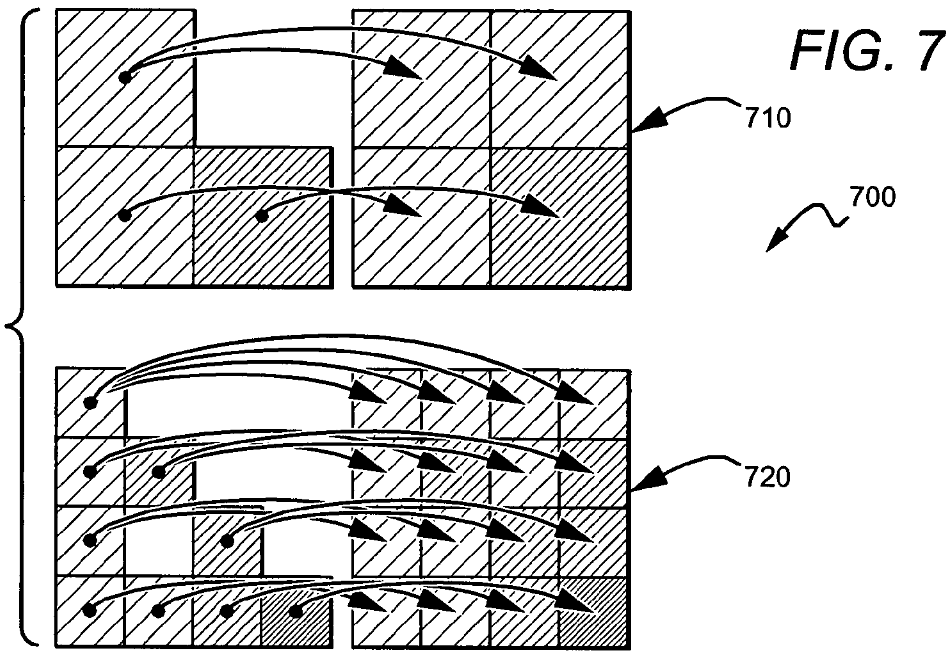
FIG. 7

COMPUTER ANALYSIS AND MANIPULATION OF MUSICAL STRUCTURE, METHODS OF PRODUCTION AND USES THEREOF

This application is a United States Utility Application that claims priority to U.S. Provisional Application 60/597,642 filed on Dec. 14, 2005, which is commonly-owned and incorporated herein in its entirety.

FIELD OF THE SUBJECT MATTER

Methods, systems and applications for using computers to analyze and manipulate musical structure are described herein. Theories, architectures and algorithms are outlined herein as computer-based approaches for creating, varying, and hybridizing musical works. Capabilities embodied in the form of a software library are described, as well as a number of proposed applications that make use of those capabilities.

BACKGROUND

Computers networks are drawing people towards forms of interaction and collaboration that were previously impractical. Music is one medium where computers can enable expression and collaboration by allowing persons to drive musical production solely through aesthetic musical control, leaving technical musical control to the computer.

The growing pervasiveness of computer networks may be shifting the emphasis of human communication from the transmission of objective to subjective information. As computers take over the tasks of storing, calculating, and tracking data, humans have increasingly used these networks to exercise personal, preference-driven agendas. This trend is driven by the ability of computers to create, transmit, and correlate subjective data across large numbers of persons.

Using computers, humans are freer to form electronically-connected groups in order to optimize the exchange of subjective information such as aesthetic and political views. When people use search engines like Google they avail themselves of a consensus gleaned from statistical calculations well beyond the ability of the average person, and which are unavailable to those who rely on non-electronic sources of information. Chat rooms and weblogs or “blogs” allow ideas and attitudes to evolve more rapidly now than when conversational discourse was constrained by physical proximity.

As social exchange becomes more concerned with personal expression than with the transmission of facts, it seems likely that interactive, non-verbal forms of expression, such as image sharing, music sharing, and game playing, will evolve to take advantage of the connections and data handling capabilities offered by computers. In other words, as humans more and more come to embody network nodes, they are more likely to exercise decision-making based on what-goes-with-what rather than what-means-what or what-is-what, Computer networks will provide for many evolving senses of contiguity based on participants distributed in unpredictable ways. This conjecture is based on the simple assumption that humans will take the path of least resistance to satisfy their personal goals, taking full advantage of the division of labor offered by computing, and is independent of more refined notions such as Postmodernism, “electronic villages”, etc.

Some forms of human expression, such as painting, poetry, and speech writing, tend to be privileged endeavors where one person with special skills prepares a self-contained work meant to be consumed by other persons who have the ability to appreciate but not necessarily produce such a work. Other forms of expression, such as conversation, fashion, and interior/exterior design, involve production skills possessed to some degree by most people, and these acts of expression can therefore occur in situations where the participants produce a collective result. In a given social setting it is not uncommon for conversation and attire to be constrained by a consensus among the participants as to the proper degree of formality and the prevailing areas of interest. In ordinary speech involving more than one speaker, each person generates responses based on remarks by others taking part in the conversation, and the conversation itself is collectively authored by all of its participants.

Music is primarily a privileged type of expression. Most people can recognize novel pieces of well-formed music, but additional training is required in order to produce well-formed music. When listening to music, humans have an innate sense of musical grammar that makes sense of musical structure. But the ability to engage musical grammar in personal expression requires control over harmonic and rhythmic structure that is beyond persons lacking specialized knowledge and practical experience. Jazz musicians, for instance, are capable of engaging in improvised musical “conversations” based on years of musical training. More typically, the disparate parts that constitute a musical work are the product of a single composer. If human speech capabilities were on a par with music capabilities, then most humans would merely listen to individual speakers expressing speech-like texts.

Fashion is an example of more participatory expression. Persons with a shared fashion sense often congregate in clubs or other settings where each person’s individual clothing choices becomes part of a larger scene. That scene takes on a certain character based on the ways in which those individual choices echo or complement each other. The overall effect is generated collectively by the participants, as well as the various designers from which those participants made their fashion choices.

Computers and computer networks can enable music to graduate from a privileged form of expression to a more participatory one. This is achieved by removing the barrier to musical production: the fact that most people have an innate sense of musical grammar when it comes to hearing music, but not when it comes to producing music. Many aspects of musical grammar can be objectively described, and therefore tasked to a computer. This division of labor leaves the human listener free to guide musical production based solely on subjective decisions made during the listening process.

Music is an ideal medium for expressing contiguous relations rather than symbolic relations, which are the domain of language. As human expression evolves towards transmission of aesthetics and attitudes, leaving computers to work out the objective concerns, perhaps non-symbolic forms of expression such as music will overtake language as the primary avenue for human information exchange. Computer-enabled musical production would allow for music to be created in a distributed manner, as is already the case with conversation and fashion. Participants could inject ad-hoc musical elements to be integrated into a coherent whole by well-formed constraints applied by computers. Music can then evolve and form new styles, reaching various levels of consensus, that might have ever occurred in the hands of individual composers, musicians, or producers.

Therefore, it would be ideal if one could develop a music modification system and related methods wherein musical scores or pieces can be created, analyzed, varied, hybridized, manipulated, otherwise modified or a combination thereof to create new and/or different musical scores and pieces in a systematic and straight-forward manner such that anyone who loves music can participate in the process.

SUMMARY OF THE SUBJECT MATTER

A music modification system is provided and described herein, which includes: a) a computer, b) a music element library, c) at least one part-score database, d) a software code that executes a music modification system on the computer, wherein the music modification system accesses or manipulates the information in the music element library and accesses the at least one part-score database, and e) a graphical or audio user interface that is coupled to the computer.

Methods of modifying a musical score or piece are described herein and include: a) providing a music element library, b) providing at least one part-score database, wherein the database comprises at least one music score, at least one music pieces, at least one music part or a combination thereof, c) providing an executable music modification system, and d) utilizing the music modification system and the music element library to modify at least part of the at least one part-score database.

A software code is also described that executes a music modification system on a computer, wherein the music modification system accesses or manipulates a set of information in a music element library and accesses at least one part-score database.

BRIEF DESCRIPTION OF THE FIGURES

FIG. 4 shows some possible routs for the evolution of the rhythm in FIG. 3.

FIG. 7 shows row/column pairs mapped to attack patterns.

DETAILED DESCRIPTION

Surprisingly, a music modification system and related methods have been developed and are described herein wherein musical scores or pieces can be created, analyzed, varied, hybridized, manipulated, otherwise modified or a combination thereof to create new and/or different musical scores and pieces in a systematic and straight-forward manner such that anyone who loves music can participate in the process.

A system in which musical structure is manipulated, varied and/or hybridized is contemplated and described herein, wherein the system uses at least one technique or algorithm that provides measures and representations of harmonic, melodic, rhythmic and contrapuntal material based on hierarchical, grammatical, and self-similar structures underpinning the evolution of individual works and styles of music, such as harmonic reductions, note lists split into voices and/or note lists that have been split into voices further split into segments, rhythmic analysis, analysis of contrapuntal configurations, and/or analysis of contrapuntal voices.

Figure 1:
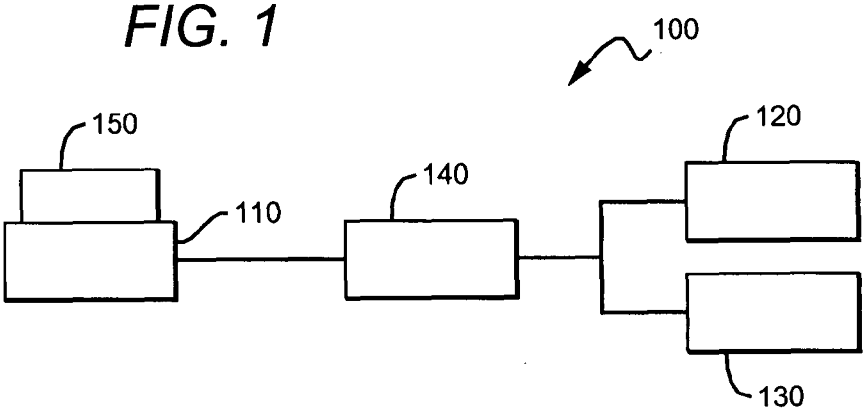
FIG. 1 shows a contemplated system, as described herein.

Specifically, as shown by a contemplated embodiment in FIG. 1, a music modification system 100 is provided and described herein, which includes: a) a computer 110, b) a music element library 120, c) at least one part-score database 130, d) a software code 140 that executes a music modification system on the computer, wherein the music modification system accesses or manipulates the information in the music element library 120 and accesses the at least one part-score database 130, and e) a graphical or audio user interface 150 that is coupled to the computer.

Figure 2:
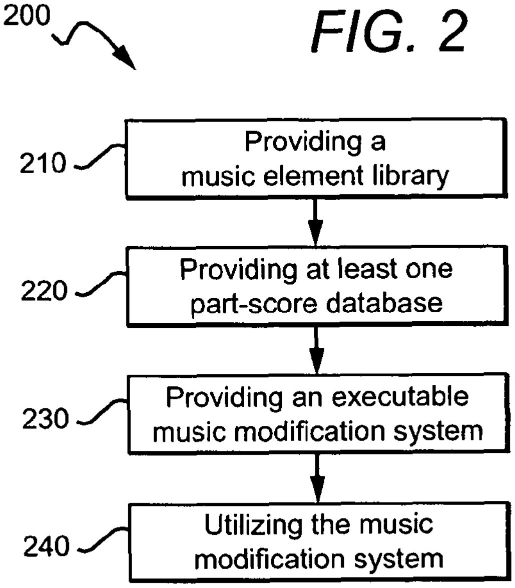
FIG. 2 shows a contemplated method, as described herein.

Methods of modifying a musical score or piece 200 are described herein, shown in FIG. 2, and include: a) providing a music element library 210, b) providing at least one part-score database 220, wherein the database comprises at least one music score, at least one music pieces, at least one music part or a combination thereof, c) providing an executable music modification system 230, and d) utilizing the music modification system and the music element library to modify at least part of the at least one part-score database 240.

A software code is also contemplated that executes a music modification system on a computer, wherein the music modification system accesses or manipulates a set of information in a music element library and accesses at least one part-score database. In some embodiments, the software code comprises the code as shown in FIG. 1.

As used herein, the phrase "part-score database" means a database that comprises at least one music score, at least one music piece, at least one music part or a combination thereof. At least one music score refers to a musical work that is represented by showing all of the separate instrumental and vocal parts combined together. Music scores come in various formats, including: a full score, a miniature score, a study score, a piano score, a vocal score, or a short score. At least one music part refers to a single instrument or vocal part, and at least one music piece refers to the numerous musical works that are between a music part and a music score. These music pieces refer to works like ring-tones, choral a cappella arrangements, instrumental works, and those items not normally considered to be a score or a part.

As used herein, the phrase "music element library" means that that information related to rhythm, harmony, melody, structure and texture. In some embodiments, the music element library comprises a collection of at least one database of techniques or algorithms that provide measures and representations of harmonic, melodic, rhythmic and contrapuntal material.

There are several techniques that provide measures and representations of harmonic, melodic, rhythmic, and contrapuntal material, based on hierarchical, grammatical, and self-similar structures underpinning the evolution of individual works and styles of music. Harmonic reductions, note lists split into instrumental parts, note lists split into instrumental parts and further split into contrapuntal voices, and note lists split into voices and further split into melodic segments are examples of some of the techniques that can be utilized. (see: Lerdahl, Fred, and Ray S. Jackendoff 1983. *A Generative Theory of Tonal Music*. Cambridge, MIT Press; Temperley, David 2001. *The Cognition of Basic Musical Structures*. Cambridge, MIT Press). Other examples of these techniques are rhythmic analysis, analysis of contrapuntal configurations, analysis of contrapuntal voices and combinations of all of the above.

Harmonic reductions can be derived from musical pieces for the purpose of determining tonal centers at multiple time resolutions. In this technique, the piece is repeatedly subdivided into time spans encompassing progressively smaller units. In regular meter, each subdivision is created by subdividing the time span by the number of time specified by that meter at that level. In duple meter for example each time span is subdivided into two. Subdivisions based on other criteria, such as note distribution, or "extramusical" elements such as a film timeline, may also be used.

The notes within each time span are analyzed to determine the best tonality classification, where each tonality is constituted by a scale, typically diatonic or pentatonic, but possibly atonal or exotic, and scalar mode, or other pitch and interval ranking, within that key. In the case of diatonic-based tonality the following scheme can be used, and for other tonal, timbre-based, or event-based structures an analogous scheme can be implemented.

A weighted list of pitch classes (where pitch class equals pitch modulo 12) is generated based on the notes within that time span. Each note is weighted by the rank of is pitch among all pitches occurring in that time span, sorted in descending order so that lower pitches receive larger weights. Each note is weighted by duration, octave, and perhaps other factors such as text, timbre, or events on an external timeline as in a film score, interactive game, or other audio alert or stream. Each pitch class, or pitch, or chord, is weighted based on its representation among the notes. The weight of each pitch class, for example, might be the sum of the weights assigned to the notes having that pitch class.

The weighted pitch classes are matched against the pitch classes comprising each mode within each key. A mode is a rotation of the ordered pitch classes constituting a major (diatonic) scale. There are twelve keys, and each key has a single unique diatonic scale. There are seven modes per key, each mode designating a different starting point within that key's major scale. The tonic of the key is one of the twelve pitch classes, whereas the root of the mode is a scale step within that key's major scale, where that scale step is the center of pitch gravity for that mode. The fitness between each key/mode combination, and each of the weighted pitch classes derived from the notes' pitches is calculated. A pitch class falling on the root of the mode receives the largest score. A pitch class falling on the third or fifth scale steps receive the next largest score. Pitch classes falling on other scale steps receive the lowest nonzero score. Pitch classes that fall outside the diatonic scale for that key receive a weight of 0. Each mode is given a score based on the sum of the mode step scores corresponding to the pitch classes of the notes, and the weights assigned to those pitch classes. The key/mode combinations having the highest score are taken as the prevailing tonalities for the notes within that time span.

The result of this analysis based on harmonic reductions provides the following measures: a) the degree to which the pitches of the notes within that time span are in agreement with diatonic, pentatonic, or other target tonality, and the degree to which those pitches delineate triadic, or other desired pitch structure, within a particular mode or other chosen pitch arrangement; and b) the particular tonality (key/mode combination) that provides the best match to the pitches of the notes within that time span.

In a second method, note lists are split into voices, using a genetic algorithm or other optimization scheme, and can be used to achieve the following: 1) optimize the structure of pitch intervals between successive notes within each voice, versus the intervals between pitches in different voices (in Western music this optimization typically consists of minimizing the intervals between successive notes within a voice); 2) prefer a smaller number of voices; 3) in most cases, disallow simultaneous notes within any single voice.

A third method, which builds on the second method described above, utilizes note lists constituting voices, which are then split into segments, using a genetic algorithm or other optimization scheme, to achieve the following: 1) minimize the time offset between successive notes within segment, versus the time offsets between the last note and first note, respectively, of successive segments; 2) prefer segments with roughly five notes.

Rhythmic analysis may also be used to determine the most likely sequence of rhythmic elaborations to have produced a given rhythm. This analysis provides a series of rhythmic reductions, where each higher level of reduction represents a more generic rhythmic configuration. Distinct rhythms often share similarities with each other at some level of reduction, even if the rhythms seem very different on the surface. According to music theorist Fred Lerdahl, in *A Generative Theory of Tonal Music*, "It may in fact be possible to construct a system in which certain musical ideas can be related only if certain transformations (in the general sense) take place; such a system would establish the relative proximity or distance of musical ideas." (Lerdahl and Jackendoff 1983).

When discussing rhythmic analysis, the following scheme pertains to duple meter, but could be mapped onto compound meter as well. Notes, or configurations of notes, that exist at deeper levels in the reductional analysis are considered more structurally important than notes added at levels closer to the musical surface. In *Theory of Suspensions*, Arthur Komar defines the following constraint on the placement of new notes at each stage of rhythmic elaboration: "The set of metrical levels which arises in connection with the generation of a note in a given time-span governs the placement of further notes to be generated within that time-span. [ . . . ] Where a given note is generated in the nth equal part of a given time-span, other notes can be subsequently generated only in portions of that time-span where the initial time-point and strongest beat thereof coincide." (Komar 1971)

Komar's rule for rhythmic elaboration expresses the idea that rhythmic patterns are carved out one unambiguous step at a time. In duple meter this constraint permits only the addition of a rhythmic interval spanning a single beat at some beat level, where the beat strength at the end of that interval is relatively stronger than at the beginning. In other words, every newly generated attack is an upbeat at some metrical level.

Komar says that new attacks can be inserted before existing background attacks only if there is no stronger beat between the new attack and the preexisting attack. In duple meter, this approach is equivalent to saying that new attacks can only appear at power of 2 time intervals before relatively stronger attacks. In the new foreground configuration the preexisting attack may be removed, in which case the new attack is considered to be a syncopation of the preexisting attack. Or both attacks are retained, and the new attack acts as a local upbeat to the preexisting attack. Further time displacements can be applied to the new attack, with the restriction each additional displacement must occur at a different power of 2. Applying the same time displacement twice would produce a disallowed shift from a relatively weak beat onto a stronger beat, since, within duple meter, beat strength alternates along any given power of 2. A time displacement onto a relatively stronger beat undermines the orientation within the overall meter provided by the initial (and strongest) attack.

Figure 3:
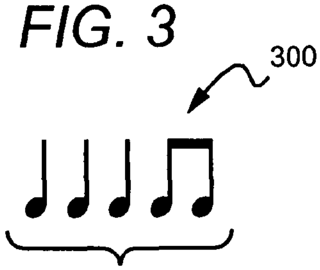
FIG. 3 shows an example rhythm in 4/4 meter.
Figure 5:
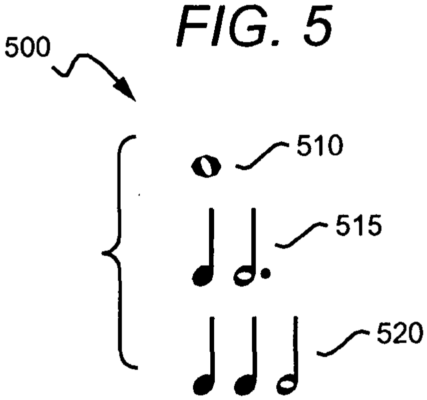
FIG. 5 shows an invalid sequence of rhythmic evolution steps.

FIG. 3 shows one bar of 4/4 meter 300, which is the rhythm and could have evolved a number of ways. FIG. 4 shows several ways 400 in which the 4/4 rhythm 300 (and 425, 445, 465 and 475 in FIG. 4) from FIG. 3 could have evolved. In FIG. 4, the 4/4 meter evolves from an ultimate background rhythm 415 consisting solely of a single attack on the downbeat, which is shown in the various paths. The first path 420 shows two half notes 421 evolving into the resulting 4/4 meter 425. The second path 440, which starts with a dotted half note and eighth note 430 eventually evolves into the 4/4 meter 445. The 4/4 meter (465 and 475) shown in paths three 460 and four 470 evolve from the half note/dotted quarter note/eighth note 450. As shown in FIG. 5, the sequence of elaborations 500 shown by numbers 510, 515 and 520 would not be valid within 4/4 time, even though the final result 520 is valid, because the dotted half-note on beat two 515 encompasses the stronger beat on beat two.

In duple meter there is a simple way to state the constraint on rhythmic elaboration: each newly generated attack must occur exactly one beat before a relatively stronger background attack, at some metrical level. In other words, a newly generated attack must function as an upbeat at some metrical level. Here the notion of upbeat is not confined to the end of a bar; it simply means a weak beat immediately preceding a relatively stronger one at the level of sixteenths, or quarter notes, or whole notes, etc. Newly generated attacks can be treated as displacements of attacks in the background time-span, in which case the background attacks are deleted in the new foreground. Alternatively both the new attacks and background attacks can be retained. Syncopation occurs when the background attacks are deleted, leaving only the displacements of those attacks. Komar defines syncopation as "a time-span which contains a stronger beat within it than at its beginning" (Komar 1971).

Figure 6:
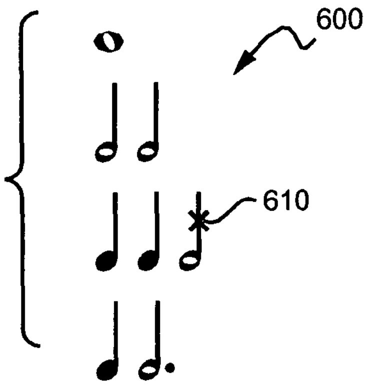
FIG. 6 shows an invalid sequence of rhythmic evolution steps. The "X" indicates that the background note has been deleted in the foreground time-span.

Syncopation refers to rhythmic configurations which place notes on relatively weak beats. Syncopation provides a sense of departure from a regular pulse at some metrical level. In Komar's formulation, syncopation is accomplished by shifting activity onto a time-point generated by subdivision of a given time-span (Komar 1971). Syncopation conflicts with meter at a relatively local level. Syncopation is perceived as such only when there is a higher metrical level that retains a sense of global accentuation. FIG. 6 shows an example 600 showing how a syncopated note might be derived from background levels. The "X" indicates that the background note 610 has been deleted in the foreground time span.

If both attacks are retained then a new time displacement can be applied to the pair of attacks, provided that the new displacement occurs at a power of 2 that is different from the one used to create that pattern. Displacements at different powers of two can thereby be compounded to produce many possible hierarchies of local upbeat-downbeat configurations with various degrees of syncopation, where no single power of 2 displacement is used more than once. Within such a hierarchy each attack can be ranked in terms of structural importance, based on the assumption that a downbeat at a given level is relatively more important than an upbeat at that level. And that a downbeat at one level may function as an upbeat to a relatively stronger downbeat at another level. This ranking provides a linear measure of the highly nonlinear ebb and flow of rhythmic elements within duple meter.

Within any resulting pattern containing more than one attack, any attack is some power of 2 away from at least one other attack within the pattern. And no pair of attacks, or pattern of pairs of attacks, is separated by any beat that is stronger than that corresponding to the power of 2 that created the newer member of that pair. All this helps to maintain an overall metrical orientation, and a hierarchy of relative importance among the attacks within the pattern. Actual rhythms will rarely fit entirely into such patterns, rather these patterns form building blocks, within which reductional analysis can be applied. The rhythmic analysis is also described in the following reference, which is incorporated herein in its entirety by reference: Komar, Arthur, J. 1971. *Theory of Suspensions: A Study of Metrical and Pitch Relations in Tonal Music*. Princeton, Princeton University Press.

Work by nineteenth century number theorists Adrien Marie Legendre, Ernst Eduard Kummer, and Edouard Lucas drew a link between carries in binary arithmetic and the patterns formed by even versus odd binomial coefficients (*Chaos and Fractals*, Peitgen, Jurgens, and Saupe 1992). Carries in binary arithmetic are equivalent to beat strength in duple meter. The number of carries that occur between the binary representation of one time-point and the next determines the beat strength of that second time-point. The patterns formed by the distribution of odd binomial coefficients along the rows of Pascal's Triangle turn out to satisfy the rules for musical elaboration via syncopating and/or subdividing material at successive metrical levels.

Lucas found a way to determine whether a given binomial coefficient is even or odd. Pascal's triangle is the arrangement of binomial coefficients into a triangle. Consider Pascal's Triangle with the rows numbered from 0 starting at the top, and columns numbered from 0 starting at the left. Lucas proved that the odd coefficients appear wherever the nonzero bits in the column number are a subset of the nonzero bits in the row number. This is equivalent to saying that along each row of Pascal's triangle the odd coefficients appear at columns which share nonzero bits with the column of the last nonzero coefficient in that row.

Pascal's Triangle illustrates the relationship between binomial coefficients:

C(0,0)
C(1,0) C(1,1)
C(2,0) C(2,1) C(2,2)
C(3,0) C(3,1) C(3,2) C(3,3)
C(4,0) C(4,1) C(4,2) C(4,3) C(4,4)
C(5,0) C(5,1) C(5,2) C(5,3) C(5,4) C(5,5)
C(6,0) C(6,1) C(6,2) C(6,3) C(6,4) C(6,5) C(6,6)
and so on, where C(n, k)=n!/((n−k)! k!).

C(n,k) is the number of combinations of n elements taken k at a time, and corresponds to the kth binomial coefficient for the polynomial (1+x)n. Note that for C(n,k), n indicates row number (counting from the top), and k indicates column number.

The values of the first eight rows are:

1
1 1
1 2 1
1 3 3 1
1 4 6 4 1
1 5 10 10 5 1
1 6 15 20 15 6 1
1 7 21 35 35 21 7 1

Lucas showed that the parity of an entry in Pascal's Triangle depends on the bits in the row and column numbers. If the nonzero bits in the row are a subset of the nonzero bits in the column, then C(row, column) is odd (Peitgen, Jurgens, and Saupe 1992).

1
1 1
1 0 0 0 1
1 1 0 0 1 1
1 0 1 0 1 0 1
1 1 1 1 1 1 1 1

This analysis is also shown in the following reference: Peitgen, H.-O., Jurgens, H., and Saupe, D. 1992 *Chaos and Frac-*

*tals: New Frontiers of Science*, Berlin and New York, Springer-Verlag, which is incorporated herein by reference in its entirety.

Since the same power of 2 time displacement can only be used once in the formation of a particular attack pattern, the two binary numbers, one representing displacements where both attacks are retained, the other representing syncopations, cannot contain any binary 1's in the same place. Therefore by flipping Pascal's Triangle upside down, the same patterns of odd binomial coefficients that were used to represent patterns of attacks can be used to represent legitimate time shifts for those attack patterns. The odd coefficients found along some row, i, counting starting at 0 from the bottom of the first n rows of Pascal's Triangle, where n is some power of 2, represent valid displacements for the attack pattern represented by the binomial coefficients found at row (n-i). This mapping (710 and 720) is illustrated in FIG. 7.

Figure 8:
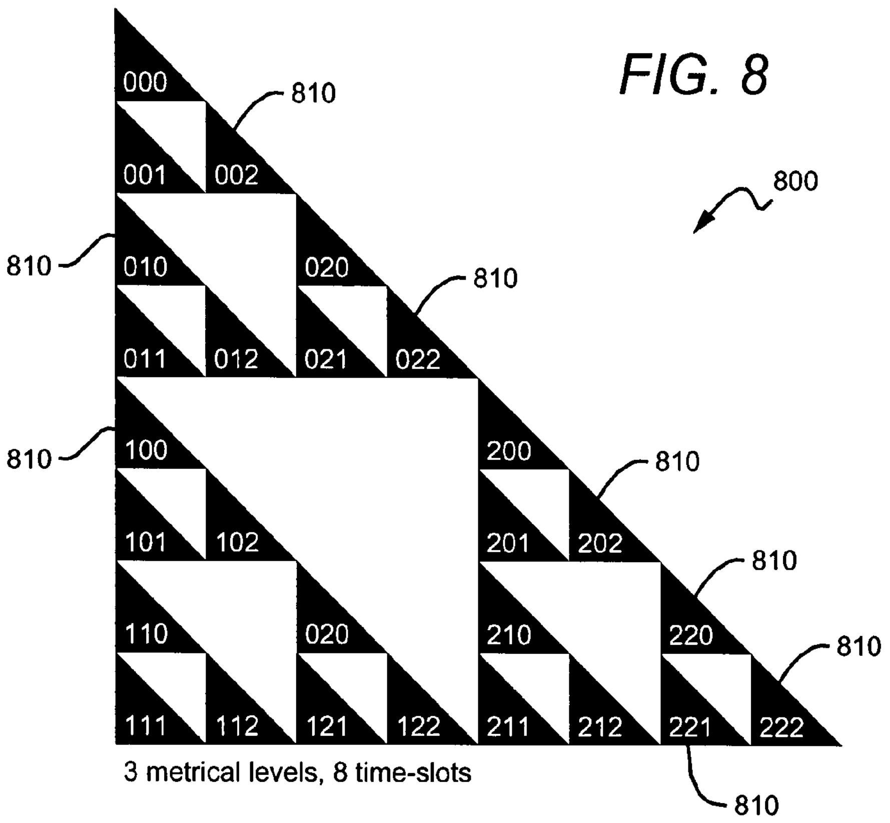
FIG. 8 shows row/column pairs mapped to ternary addresses on an approximation of the Sierpinski Gasket.

Since the generator and offset cannot share any nonzero bits the two numbers can be combined into a single ternary number. We only need to consider three of the four possible combinations of bits at corresponding places in the generator and offset, since a 1 at the same binary place in both the generator and the offset is disallowed. Those three combinations of binary digits are mapped onto ternary digits as follows: the 1's in the binary representation of the generator are set to 0, the 0's in the binary representation of the generator are set to 1, and the 1's in the binary representation of the offset are set to 2. The relationship between the resulting ternary numbers and the pair of binary numbers from which it is constructed can be most easily visualized as a fractal known as the Sierpinski Gasket, which has dimension log(⅔). In the ternary representation of the attack pattern a 0 represents repetition at that power of 2, and a 1 or 2 represents a shifted or unshifted version, respectively, of that pattern. A binary representation consisting of all 0's represents attacks in all time slots, a binary representation consisting of all 1's represents a single attack in the first time slot, and a binary representation consisting of all 2's represents a single attack in the first time slot. The ternary numbers representing patterns of time-points are called addresses, because each digit represents a sub-triangle of a sub-triangle etc on the Sierpinski Gasket. Therefore each pattern of attacks that can be formed following the Komar's rule for contrapuntal rhythmic elaboration can be associated by a ternary address associated with a region of the Sierpinski Gasket. The ternary addresses 810 on an approximation of the Sierpinski Gasket 800 is shown in FIG. 8.

The Sierpinski Gasket can be produced by a 1-dimensional cellular automaton where the value of a given location is determined by the XOR rule applied to the location immediately above and its neighbor. Wolfram describes the symmetry of the gasket in terms of global pattern formation arising from local rules, and the fact that the XOR rule governing the CA that forms the gasket will eventually replicate a given pattern if the CA is run on the same pattern with 0's inserted between each element of the original pattern (Wolfram, Stephen 2002. *A New Kind of Science*. Champaign, Wolfram Media, which is incorporated herein in its entirety by reference). The procedure in 3.1 is hierarchical as opposed to being governed by strictly local rules, as the CA based on XOR is. But this connection to the cellular automata and the formation of global patterns from local interactions helps explain why the same set of rhythmic building blocks described above is generated at each metrical level by the allowed rhythmic operations.

Contrapuntal configurations, such as root movements, passing tones, neighbor tones, and suspensions, can also be analyzed, as mentioned earlier. This mode of analysis is designed to prefer notes in the bass voice that fall on the root, fourth, or fifth, within one of the prevailing modes, within the greatest number of time spans. It also prefers passing tone configurations in the upper voices, where the adjacent notes move stepwise between triadic pitches, within one of the prevailing modes, within the greatest number of time spans. Also, this mode is designed to prefer neighbor tone configurations in the upper voices, where the adjacent notes move stepwise away from, and then back toward, some triadic pitch, within one of the prevailing modes, within the greatest number of time spans. Finally, this method of analysis is designed to prefer suspension configurations in the voices, where the vertical scalar interval of a fourth or seventh is resolved, in an adjacent note, to a third or sixth, within one of the prevailing modes, within the greatest number of time spans. (see: Komar, Arthur, J. 1971. *Theory of Suspensions: A Study of Metrical and Pitch Relations in Tonal Music*. Princeton, Princeton University Press; and Lerdahl, Fred, and Ray S. Jackendoff 1983. *A Generative Theory of Tonal Music*. Cambridge, MIT Press, which are both incorporated herein by reference in their entirety).

Contrapuntal voices can also be analyzed in terms of pitch contour across the constituent notes. The list of notes, ordered by attack time, that constitute the voice, is translated into a string of tokens representing pitch movements, between each note and the following note. A '0' token indicates that the two notes share the same pitch. A '1' token indicates that the second note has a higher note than the first pitch. A '−1' token indicates that the second note has a lower note than the first pitch. The list of tokens is analyzed for consistency of pattern in terms of successive pitch motions. The degree of repetition among patterns of successive tokens is analyzed at different resolutions. The lists of tokens are split into each possible set of disjunct sublists, where each sublist contains the same number of tokens. A score is assigned to set of sublists that indicates the maximum number of times that some particular pattern of tokens occurred in the set of sublists, divided by the total number of sublists within that set. The maximum score assigned to any set of sublists of tokens, is taken as the score representing the degree of consistency in pitch contour for that voice.

As mentioned earlier, a system in which musical structure is manipulated, varied, and hybridized is contemplated and described herein, wherein the system uses at least one technique that provides measures and representations of harmonic, melodic, rhythmic, and contrapuntal material, based on hierarchical, grammatical, and self-similar structures underpinning the evolution of individual works and styles of music, such as harmonic reductions, note lists split into voices and/or note lists that have been split into voices further split into segments, rhythmic analysis, analysis of contrapuntal configurations, and/or analysis of contrapuntal voices. Specifically, some number of musical pieces are modified so that they inhabit the same musical region in terms of harmony, melody, rhythm, and timbre. In the case of diatonic tonality, piece A is transposed so that is occupies the same tonal center as piece B, as described below.

A harmonic reduction is created for piece A, and for piece B, as described earlier. A list of possible transpositions is constructed from the twelve pitches classes. For each pitch class <6, the transposition is set to that pitch class. For each pitch class >6, the transposition is set to transposition −12, in order to transpose up or down by the smallest interval. For instance, for the pitch class 11, the transposition would be set to −1. For pitch class 6, the transposition is randomly set to either 6 or −6. The score for each transposition, for each time span in piece A, is equal to the number of prevailing tonalities in common for the transposed notes in piece A within that time span and the notes for piece B within that time span. The score for each transposition, across all time spans, is the sum of the scores for each time span in piece A, weighted by the duration of that time span. The transposition with the highest score is then applied to each note in piece A, by adding the pitch interval represented by that transposition to the pitch of each note in piece A.

Figure 9:
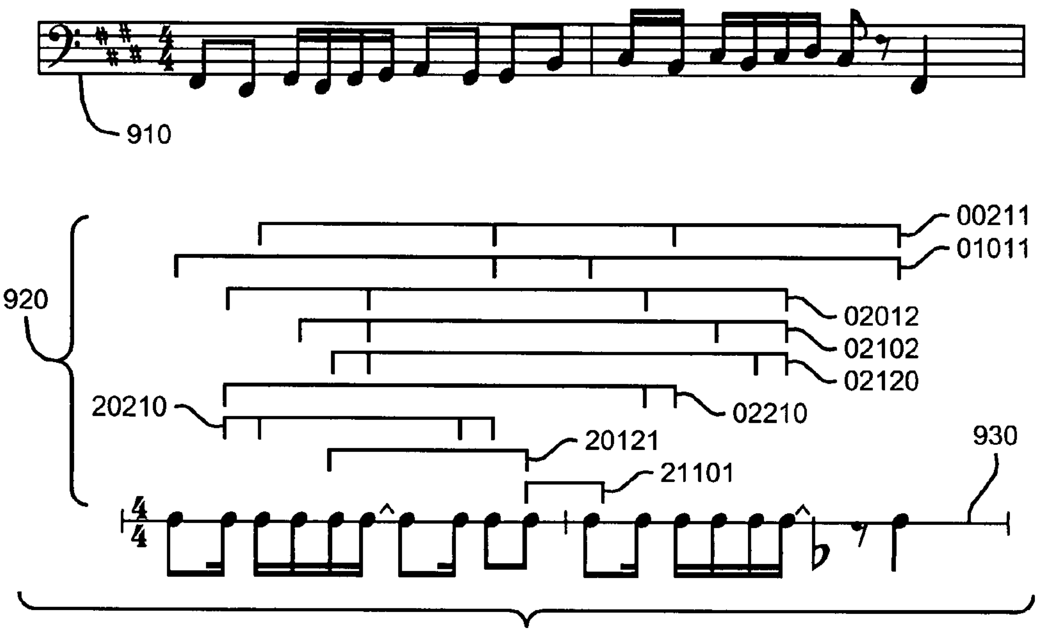
FIG. 9 shows a contemplated musical excerpt and analysis.

Voice-leading can be optimized within music pieces. The following scheme is one example, based on tonal counterpoint. Each non-drum part within the piece is split into voices, using one of the techniques described earlier. Each resulting voice is split into segments, also as described earlier. Each resulting segment is decomposed into mutually exclusive sets of attack patterns, where each pattern can be located as the odd entries on one of the rows of Pascal's Triangle, where that pattern may been time shifted by a number of sixteenth notes that contains no binary bits in common with the zero-based row number of that pattern. For example, an excerpt of the bass part from Amel Larrieux"s "Tell Me" 910, decomposed into rhythmic patterns 930 that correspond to arrangements of odd binary coefficients 920 on rows of Pascal's Triangle is shown in FIG. 9.

Within each set of intersecting patterns the final note is given the greatest weight when analyzing the tonality of the passage. Other notes within that set of intersecting patterns receive relatively less weight for each power of 2 that composes the difference between the attack of that note, and the attack of the final note in those patterns, because each power of 2 indicates an additional layer of upbeat-downbeat relationships intervening between that note and the final note. Notes with higher weights are more constrained by the objective function toward more consonant harmonic values, in terms of diatonic and model roots, triads, and scale steps because they would have emerged at an earlier stage in the evolution of the rhythmic pattern.

Alternatively, each note within each set of intersecting patterns is assigned a degree of pitch leeway, measured in some units such as half steps, that is scaled to the difference in the number of binary bits between the attack of that note, and the attack of the final note in that set of attack patterns. Notes which, based on this analysis, would have evolved at deeper structural levels are held relatively fixed compared to notes that would have evolved closer to the musical surface. In this case the notes can be assigned weights as in section a, or all assigned equal weights.

A harmonic reduction can then be created of the piece. The pitches of each note are adjusted within the leeway assigned that note, or pattern of notes, based on the note weight assignments, using a genetic algorithm or other optimization scheme, to achieve the following in the case of diatonic tonality, or the equivalent within other tonalities: a) maximize the number of bass notes whose pitches fall on the root, fourth, or fifth, within the notes belonging to time span, for any of the prevailing tonalities for that time span; b) maximize the number of note configurations in upper voices that constitute passing tones, neighbor tones, and suspensions, within the notes belonging to time span, for any of the prevailing tonalities for that time span; c) maximize the number of diatonic tones versus non-diatonic tones within the notes belonging to time span, for any of the prevailing tonalities for that time span; and/or d) weight the results for each time span by the duration of that time span when determining which pitch adjustments to finally apply to the entire note list.

In contemplated embodiments, the rhythms can be varied. The following scheme is one example, which increases the amount of repetition that occurs of note patterns that have clearly defined pitch contours within single voices: 1) each non-drum part within the piece is split into voices, as described earlier; 2) each resulting voice is analyzed in terms of pitch contour, also as described earlier; 3) each resulting voice is decomposed into mutually exclusive sets of attack patterns, where each pattern can be located as the odd entries on one of the rows of Pascal's Triangle, where that pattern may been time shifted by a number of sixteenth notes that contains no binary bits in common with the zero-based row number of that pattern; and 4) repetition is increased of note patterns with well defined pitch contours. The smallest power-of-2-sized time window that contains the greatest number of sublists of successive notes, with the highest pitch contour score, is determined. The smallest power-of-2-sized time window that contains the greatest number of sublists of successive notes, with the highest pitch contour score, is determined. The ternary addresses associated with each set of attack patterns are manipulated, and then used to specify a new attack pattern that contains a repetition of the original attack pattern, offset by some power of 2 number of time steps. Each digit at the place in the ternary address that corresponds to the same power of 2 that was determined for the time window in section a, is set to 0. The note list is reconstituted for the attack pattern that corresponds to the resulting address. The pattern of pitches that existed in the original note list is repeated across the newly added notes.

The consistency of pitch contour is then optimized within music pieces. In a contemplated embodiment, this optimization can be accomplished by going through the following steps: a) each non-drum part within the piece is split into voices; b) each resulting voice is analyzed in terms of pitch contour; c) each resulting segment is decomposed into mutually exclusive sets of attack patterns; and d) the pitches of each note are adjusted within the leeway assigned that note, or pattern of notes, based on the note weight assignments, using a genetic algorithm or other optimization scheme, in order to maximize the sum of scores assigned the constituent voices based on the pitch contour analysis.

Sequential patterns can then be created, which are then used to determine musical form. In this step, a pattern of zero-based indices is generated that will determine the placement of musical sections within the overall piece. The pattern {0, 1, 0, 2} for example indicates that the first section is followed by the second, which is in turn followed by a repetition of the first section, finally ending with the third section. The system generates patterns that are likely to feature a similar amount of repetition, novelty, and direction at each level of pattern construction, from individual variations at the local level, to patterns of variations at the intermediate level, to patterns of patterns at the global level. A pattern characterized by similar amounts of repetition at multiple time scales is produced using a variation on the Voss Algorithm, which creates patterns that approximate a 1/f distribution, aka Pink Noise. This algorithm could be used to sequence sections of music or any other type of temporal pattern. A version of this algorithm is implemented as follows:

> at each time step, between one section and the next, an index is generated that will determine the selection of that next section. That index is the sum of n random values, either 0 or 1, where n is the exponent that determines the length of the pattern. That is, if the pattern length is 16, then n=4;

> for each m, where 0<=m<n, a new value, either 0 or 1, is generated whenever the zero-based rank of the time step modulo 2^m is equal to 0. Otherwise the previous value for that m is retained in the sum. So, for m=0, a new 0 or 1 is generated at every time step; for m=1, at every other time step; at m=2, at every fourth time step, and so on.

The pattern should also provide a sense of direction and return, insofar as the patterns of repetition should favor certain variations, and sets of variations, over others. This is accomplished by biasing the selection of 0 versus 1 in the modified Voss Algorithm, rather than using a uniform distribution, This bias is enforced using the Golden Mean Shift, from symbolic dynamics: a) if the previous value is 0, then the next value is a uniform random selection of 0 or 1; b) if the previous value is 1, then the next value is 0.

The pattern is then used to create a sequence of music sections constituting a piece. The first section in the piece is the section indexed by the first element of the pattern, the second section in the piece is the section indexed by the second element in the pattern, and so on.

EXAMPLES

Example 1

Remixer Application

The remixer takes a selection of short musical pieces as inputs. Each piece typically consists of two, four, or eight bars from a longer piece, in multi-track MIDI format. Each piece consists of some number of parts, where each part is assigned to a role such as one of the following: bass, lead, comp, pad, and drums, or where the role assignments take place dynamically. Each piece constitutes a looping pattern, and their constituent parts all fit within the same overall duration.

In the case of duple meter, the duration of each piece, and its parts is some power of 2, typically 32 or 64 sixteenth notes. For other meters, other characteristic lengths will apply. In one contemplated embodiment, the pieces must be in 4/4 meter, or capable of being mapped onto 4/4 meter. Any duple meter (2/4, 2/2, 8/4, etc.), can be mapped into 4/4 simply by repositioning the bar lines four quarter notes apart. Compound meter (3/4, 6/8, etc.) can be mapped into duple meter by doubling the duration of the first of each three-beat pattern, and by delaying the second and third beats by a single beat. This mapping is then reversed to produce the final result.

The parts from these source pieces are recombined to create new pieces, This process is popularly known as "remixing" or "mashing". For each role in the new piece, a part occupying that role in one of the source pieces is selected. Once the selection of source parts for the new piece is made, variations of the selected parts are generated, and those variations become the constituent parts of the new piece. Variations consist of some combination of syncopation, repetition, and pitch inversion.

There are a number of manipulations that can be used to produce a variation for a particular part, of which the following are samples. Other types of compositional strategies can be applied to these or other types of musical mixes. These manipulations include a) with some probability pitches for the part will be inverted, within the prevailing mode, about the median pitch; b) with some probability the part will be syncopated by shifting its notes forward in time by one eighth note; and/or c) with some probability the notes in the part will be rearranged and repeated such that the pattern of notes is re-triggered after 3 or 6 eight notes. Repeated notes which have a new attack time beyond the duration of the piece are deleted.

One strategy is to apply none of the variation schemes, and to leave the notes within each part as-is. One type of variation is produced by the following manipulations: 1) apply manipulations "a" and "b", as described above, to the bass part; 2) apply manipulations "a" and "c", as described above, to the lead part.

A second type of variation is produced by the following manipulations: 1) apply manipulations "a" and "c", as described above, to the bass part; 2) manipulations "a" and "b", as described above, to the lead part.

A third type of variation is produced by the following manipulations: 1) apply manipulations "a" and "b", as described above, to the bass part; 2) apply manipulations "a" and "c", as described above, to the lead part; 3) apply manipulation "c", as described above, to the drum part.

A fourth type of variation is produced by the following manipulations: 1) apply manipulations "a" and "c", as described above, to the bass part; 2) apply manipulations "a" and "b", as described above, to the lead part; 3) apply manipulation "c", as described above, to the drum part.

The new parts are then transposed so that the new piece will be composed of parts which share the same prevailing tonality to the greatest extent possible, using the process described earlier as harmonic reduction/analysis. Voice leading can then be imposed, using the process described earlier, with the following refinements: 1) each non-drum part is split into voices, using a genetic algorithm or other optimization scheme to achieve the condition that only the lowest voice analyzed in the bass part is retained, and any other notes are deleted. This condition is in order to clarify the relation between root pitches in the bass part, and pitches in the upper parts.

A longer piece composed of a pattern of sections composed by the remixer can be produced using the process described earlier where sequential patterns are created, which are then used to determine musical form.

Example 2

Cell Phone Ringtone Application

This application uses the remixing algorithms described in Example 1 to automatically mix a cell phone user's personal ringtone with the ringtone assigned to a particular caller. Each time the user receives a call a remix will be created from an automatic selection of musical parts drawn from the user's personal polyphonic ringtone currently and the polyphonic ringtone, if any, assigned to that particular caller.

The user receives two pieces of information based on the user's recognition of the constituent pieces in the remix. The user recognizes elements of his/her personal ringtone, and therefore realizes that it is his/'her phone that is ringing. The user also recognizes elements of the caller's assigned ringtone, and therefore knows who is calling.

The randomness in the algorithms and parts selection causes each resulting remix to be different from others with the same inputs. So each time the user receives a call from a caller who has been assigned a particular ringtone, the resulting remix will be different. The calls from each such caller will form a sequence of variations over time, which the user learns to recognize as belonging to a family of remixes formed from the user's personal ringtone, and the ringtone assigned to that particular caller.

Example 3

An "Environment" Application

This application refers to an environment, constituted as a MUD or as a physical space, where interaction between the users determines the selection of source pieces for a number of distinct remixes. In this contemplated application, there are multiple remixers, as described in Example 1, each of which is continually calculating and playing new remixes. Each remixer, and its playback, are isolated in a separate room. Each user selects a particular musical piece from a list of available pieces. The list is accessible from a common area housing the distinct remixer rooms. The selected piece becomes a musical tag for that user. More than one user can select the same piece.

The set of source pieces used to produce a remix in any given room is determined by the musical tags of the users currently in that room. Each user explores and traverses various remixer rooms in the environment, inhabiting first one room, then another. Whenever a user enters or leaves a room, a new remix is automatically generated from the musical tags of the current inhabitants of that room. Users will seek out rooms which conform to their musical tastes. As the music changes in response to the entrance or exit of some user from any particular room, some of the other users in that room will decide to move to other rooms to seek out other remixes, while other users will choose to remain where they are. In general, the users should eventually settle into rooms inhabited by other users who have similar or complimentary music tastes. A sort of flocking behavior results as users collectively discover spaces inhabited by other users with compatible musical tags.

As new pieces are created automatically, they will be added to the list of available pieces on the list accessible in the common area. Musical characteristics and styles evolve as newly-generated pieces are "fed back" into the environment. Numerous generations of musical permutations of will be created in a sort of collective composition.

Example 4

A Composition "Environment" Application

A composition environment allows users to construct and vary musical pieces without requiring knowledge of music theory. The environment would be a music authoring application similar to GarageBand or Acid, where the user can arrange musical fragments along a time line. Unlike audio-based music authoring tools, this environment dynamically alters the inner note structure of the musical fragments.

Harmonic, rhythmic, and voice leading optimization on the mix of musical sources is carried out using the procedures described earlier. Musical form can be imposed using the procedure described earlier where sequential patterns are created, which are then used to determine musical form. The environment can also be used to coherently arrange musical fragments along the time line of some other presentation, such as a film, slide show, or advertisement.

Example 5

A Plug-In Application

A set of plug-ins that can be used with existing commercial music sequencers is described in this example. MIDI tracks can be routed to software synthesizer plug-ins that perform manipulations on the note lists before rendering the notes into audio. Each plug-in can be aware of the other plug-ins in use within the piece, enabling musical structure on one track to affect musical output on other tracks. Audio tracks that include note metadata can be used to shape the contents of MIDI data that is sent to each plug-in.

Example 6

A "Toy Blocks" Application

Toy blocks that trigger musical output based on how the blocks are arranged relative to each other are described in this example. Rhythms can be juxtaposed based on the contiguous relationships between corners, edges, and faces of blocks. The following is one example of how placement of the blocks could represent a musical structure. Each corner represents an individual note attack. Each edge represents a single, power of 2, time interval between the attacks represented by the points at either end of that edge. Each face represents a pair of the attack pairs described in section a, where the first attack of each pair is also separated by a time interval that is a power of 2. Nested power of 2 relationships, such as those used to trace rhythmic evolution in section I.D, can be directly explored by placing the blocks in various configurations. Harmonies in the form of simple pitch collections can be loaded into each block. As blocks come into contact with one another, the pitch content of each block is adjusted so that the entire set of pitches, across all blocks, is optimized using the procedures described above. The music constituted by the sum of the blocks' rhythms and harmonies changes as the blocks are placed in different arrangements.

Example 7

Location-Based Applications

Location-based applications where musical mixes are created based on proximity and/or state are described in this example. As the user walks down a street multiple musical streams are broadcast by other users and/or establishments nearby. Broadcasts are aimed at particular channels, so that the user can select from various combinations of musical inputs. Harmonic, rhythmic, and voice leading optimization on the mix of musical sources is carried out using the procedures described earlier. Musical form can be imposed using the procedure described earlier where sequential patterns are created, which are then used to determine musical form.

Example 8

A Music-Based Search Engine

Proximity to a given musical "search string" within the search space, and between musical pieces within that space, is gauged according to the harmonic, rhythmic, and melodic analytical measures described earlier in the Detailed Description Section. Proximity between one musical piece and another within the search space is also based on the ancestry of that element in terms of musical hybrids. Musical pieces that have been used in a relatively large number of hybrids, or whose descendents have similarly been used, or which are measurably similar to such pieces, are more highly weighted in conjunction with other search criteria, in a manner similar to the weighting assigned to a given web site by Google based on the number of links from other sites.

Thus, specific embodiments and applications of computer analyses and manipulation of musical structure, methods of production and uses thereof have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:

1. A music modification system, comprising:

a computer, a music element library, wherein the music element library comprises at least one database of techniques or algorithms that provide measures and representations of harmonic, melodic, rhythmic and contrapuntal material, and wherein the measures or representations comprise an harmonic reduction of a model music piece, and at least one of a harmonic reduction of an input music piece, a note list split into instrumental parts, a note list split into instrumental parts and further split into contrapuntal voices, a note list that has been split into voices and further split into melodic segments, a rhythmic analysis, an analysis of contrapuntal configurations across voices, an analysis of individual contrapuntal voices or a combination thereof;

at least one part-score database, a software code that executes a music modification system on the computer, wherein the music modification system accesses or manipulates the information in the music element library and accesses the at least one part-score database, and a graphical or audio user interface that is coupled to the computer.

2. The system of claim 1, wherein the at least one part-score database comprises at least one music score, at least one music piece, at least one music part or a combination thereof.

3. The system of claim 1, wherein the at least one part-score database is in text format, a machine-readable format, or a combination thereof.

4. The system of claim 3, wherein the machine-readable format is MIDI.

5. The system of claim 1, wherein the at least one harmonic reduction is derived from at least one music score, at least one music piece, at least one music part or a combination thereof to determine tonal centers at a plurality of time resolutions.

6. The system of claim 5, wherein the plurality of time resolutions are subdivided into a plurality of time spans comprising a plurality of notes.

7. The system of claim 6, wherein at least part of the plurality of time spans are analyzed to determine the optimum tonality classification.

8. The system of claim 7, wherein a weighted list of pitch classes is generated based on the plurality of notes.

9. The system of claim 8, wherein the weighted list of pitch classes are matched against a set of pitch classes comprising a plurality of modes each within a plurality of keys in order to form at least one key/mode combination.

10. A method of modifying a musical score or piece, comprising:

providing a music element library, wherein the music element library comprises at least one database of techniques or algorithms that provide measures and representations of harmonic, melodic, rhythmic and contrapuntal material, and wherein the measures or representations comprise an harmonic reduction of a model music piece, and at least one of a harmonic reduction of an input music piece, a note list split into instrumental parts, a note list split into instrumental parts and further split into contrapuntal voices, a note list that has been split into voices and further split into melodic segments, a rhythmic analysis, an analysis of contrapuntal configurations across voices, an analysis of individual contrapuntal voices or a combination thereof;

providing at least one part-score database, wherein the database comprises at least one music score, at least one music pieces, at least one music part or a combination thereof, providing an executable music modification system, and utilizing the music modification system and the music element library to modify at least part of the at least one part-score database.

11. The method of claim 10, wherein the at least one part-score database is in text format, a machine-readable format, or a combination thereof.

12. The method of claim 11, wherein the machine-readable format is MIDI.

* * * * *